United States Patent

Mills

[11] Patent Number: 5,899,199
[45] Date of Patent: May 4, 1999

[54] SOLAR ENERGY COLLECTOR SYSTEM

[76] Inventor: David Mills, 15 Thomas Avenue, Roseville, N.S.W., 2069, Australia

[21] Appl. No.: 08/913,498
[22] PCT Filed: Mar. 28, 1996
[86] PCT No.: PCT/AU96/00177
§ 371 Date: Sep. 24, 1997
§ 102(e) Date: Sep. 24, 1997
[87] PCT Pub. No.: WO96/30705
PCT Pub. Date: Oct. 3, 1996

[30] Foreign Application Priority Data

Mar. 28, 1995 [AU] Australia ............... PN 2013

[51] Int. Cl.⁶ ....................................... F24J 2/38
[52] U.S. Cl. .................. 126/577; 126/680; 126/692
[58] Field of Search ..................... 126/648–655, 126/680–682, 684, 688, 692, 696, 602, 605

[56] References Cited

U.S. PATENT DOCUMENTS

| | | |
|---|---|---|
| 4,044,753 | 8/1977 | Fletcher ................... 126/688 |
| 4,120,282 | 10/1978 | Espy . |
| 4,137,897 | 2/1979 | Moore ..................... 126/680 |
| 4,223,664 | 9/1980 | Fattor . |
| 4,474,173 | 10/1984 | Ford ....................... 126/684 |
| 4,602,853 | 7/1986 | Barr ........................ 126/688 |

FOREIGN PATENT DOCUMENTS 0076455  4/1983  European Pat. Off. .

*Primary Examiner*—James C. Yeung
*Attorney, Agent, or Firm*—Ladas & Parry

[57] ABSTRACT

A solar energy collector system which includes n groups (13, 14) of arrayed reflectors (15) and n 1 target receiver systems (10, 11, 12) which present absorbing surfaces to solar radiation that is reflected by the reflectors (15) within the groups. The receiver systems (10, 11, 12) are elevated relative to the reflectors (15) and the reflectors are pivotally mounted to support structure (19) in a manner such that they may be positioned angularly to reflect incident radiation toward one or the other of the receiver systems (10, 11, 12). The collector system is characterized in that at least some of the reflectors (15) within each group (13, 14) are arranged to be pivoted to an extent such that they may be oriented selectively to shift the direction of reflected incident soar radiation form one to another of the receiver systems.

14 Claims, 3 Drawing Sheets

SOLAR ENERGY COLLECTOR SYSTEM

FIELD OF THE INVENTION

This invention relates to a solar energy collector system and, in particular, to a system which includes receivers which function to absorb solar radiation and reflectors which are arranged to reflect incident solar radiation toward the receivers. The invention is hereinafter described largely in the context of a collector system which employs receivers that incorporate evacuated tube-type collector elements which function to convert the energy content of incident solar radiation into thermal energy and to transfer the thermal energy to heat exchange fluid. However, it will be understood that the invention does have broader application, for example to systems which include receivers in the form of inverted cavity collectors and photovoltaic cells.

BACKGROUND OF THE INVENTION

A collector system of the type with which the present invention is concerned is referred to as a Fresnel reflector system and, depending upon its configuration, may be considered as an analogue of a parabolic dish or a linear parabolic trough. When configured as an analogue of a parabolic trough, the collector system comprises receivers which are supported by vertical masts and which are orientated or arrayed to form a linearly extending target. The reflectors are positioned slightly above ground level and are arrayed over an area that is selected to provide reflection of the required amount of radiation toward the target receivers. The arrayed reflectors are orientated to reflect radiation toward one target, and the reflectors are pivotably mounted and coupled to provide for synchronised single-axis tracking.

The above described Fresnel reflector system permits the use of a large scale target and provides for low construction costs relative to those that would be incurred in equivalent size parabolic trough or dish collector systems. However, a problem that is inherent in the use of ground arrayed reflectors is that shading occurs as a consequence of radiation blockage. This takes two forms, one in which radiation that would fall incident on reflectors is blocked by adjacent reflectors and the other in which radiation that is reflected toward the target by some reflectors is blocked by adjacent reflectors. This problem might be avoided by spacing the reflectors in a manner to avoid shading, but this would have the two-fold effect of reducing land utilisation efficiency and expanding the distance between reflectors and associated target receivers. This in turn would have the effect of reducing circumsolar acceptance for a given geometrical concentration ratio and, in the case of a multi-target receiver system, of increasing pipe run lengths between the receiver systems.

The present invention seeks to avoid these problems, while preserving the benefit of the Fresnel reflector system, by providing for orientation of reflectors toward either one of two target receiver systems.

SUMMARY OF THE INVENTION

The present invention may be defined broadly as providing a solar energy collector system which comprises at least one group of arrayed reflectors and at least two target receiver systems associated with the or each group of reflectors. The receiver systems are supported above ground level and are elevated relative to the reflectors. The reflectors within the or each group are supported at or above ground level and are pivotably mounted to support structures whereby they may be positioned angularly to reflect incident radiation toward one or another of the receiver systems. Also, at least some of the reflectors within the or each group are arranged to be pivoted to an extent such that they may be orientated selectively to shift the direction of reflected incident solar radiation from one to another of the receiver systems.

In use of the above defined collector system, a choice may be made as to which receiver system should be targeted to receive the reflected radiation from individual reflectors or sub-groups of the reflectors which are arranged to shift the direction of reflected radiation from one to another of the receiver systems. Thus, when two receiver systems are associated with the or each group of reflectors, daily and/or seasonal changes in the angle of incident solar radiation may be accommodated by varying the relative positions of adjacent reflectors in a manner to minimise shading whilst, at the same time, reflecting the incident radiation to one or the other or both of the two receiver systems associated with one group of reflectors.

However, the collector system need not necessarily be designed to provide for 100% avoidance of shading. Some shading in the winter season may be accepted in the interest of minimising reflector spacing and increasing the level of energy absorption in the summer season.

Therefore, while it may be desirable in some installations that all of the reflectors be arranged selectively to pivot to such an extent as to change the direction of reflection of incident radiation, it may be sufficient in other installations that some of the reflectors be arranged to pivot only to an extent sufficient to accommodate changes in the angle of incident radiation while maintaining orientation generally toward one target. Also, in some installations it may be appropriate that some auxiliary reflectors have a fixed orientation.

The collector system in accordance with the present invention may therefore be configured in a number of different ways:

(a) With all reflectors (referred to as "direction changing reflectors") being arranged to pivot to such an extent as to shift the direction of reflection of radiation from one receiver system to the other, and (b) With some direction changing reflectors and with the remaining reflectors (referred to as "angle changing reflectors") arranged to change the angle of reflection slightly whilst maintaining orientation toward one of the receiver systems.

PREFERRED FEATURES OF THE INVENTION

The relative proportions (i.e. numbers) of direction changing reflectors and angle changing reflectors within a given installation will be determined by the size of the collector system, the elevation of the receiver systems, the topography of the region at which the system is sited and the effective apertures that the receiver systems present to the or each group of reflectors. However, it will be understood that maximum flexibility will be obtained for a collector system in which all of the reflectors are in the form of direction changing reflectors.

The direction changing reflectors and the angle changing reflectors may be considered as forming two subgroups within a complete group of reflectors, and the reflectors within the respective sub-groups may be linked mechanically so as to move in synchronism with changing angle of incident radiation. However, in the case of the direction changing reflectors at least, it is preferred that the reflectors within adjacent rows should be individually pivotable.

When more than two receiver systems are associated with the or each group of reflectors, the receiver systems may be positioned to form the sides (or a portion of each of the sides) of a geometric arrangement. For example, the receiver systems as seen from above may be arranged in the form of a hexagon and the reflectors may be grouped within and/or without the boundary of the hexagon.

However, the receiver systems preferably comprise arrayed receivers and the reflectors forming the or each group preferably are arrayed in rows extending parallel to the receiver systems.

The complete collector system may comprise a single group of reflectors positioned between two spaced-apart substantially parallel receiver systems, but the collector system may comprise two groups of reflectors positioned between three spaced-apart parallel receiver systems, with one of the receiver systems presenting a target to radiation reflected from the two groups of reflectors. This particular configuration may be repeated such that for n reflector groups there will be n+1 receiver systems.

As indicated previously, each receiver system may be constituted by any device that has the capacity to absorb solar radiation and to convert solar energy into a useable form of energy. However, each receiver system preferably comprises a solar-to-thermal energy exchange system and most preferably comprises a linear array of collector elements through which a heat exchange fluid may be passed and which incorporate a solar selective surface coating. In such an embodiment of the invention the coating will function to convert the energy content of incident solar radiation to thermal energy and conduct the thermal energy to the heat exchange fluid.

As previously stated, the reflectors are located at or above ground level and the receiver systems are elevated relative to the reflectors. The reflectors may be supported upon the ground, or the entire collector system may be supported upon a platform above ground level. Such a platform may comprise a building roof and the platform may be considered as being "ground" to the system. In a particular application of the invention, the system may be mounted to a so-called sawtooth shaped building roof, and the invention is particularly suited to such a site because at least some of the reflectors will be positionable to accommodate the different dispositions of the various reflectors relative to the receiver systems.

The invention will be more fully understood from the following description of a preferred embodiment of a complete solar collector system. The description is provided with reference to the accompanying drawings.

MODES FOR CARRYING OUT THE INVENTION

Figure 1:
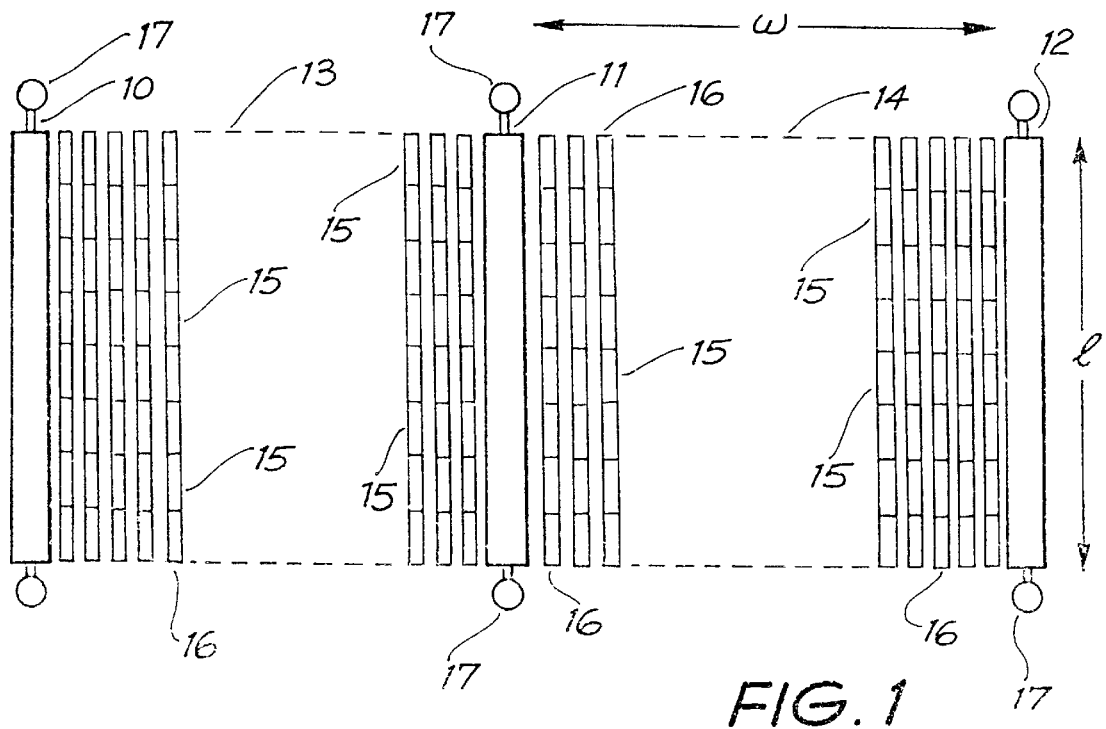
FIG. 1 shows a plan view of the complete collector system incorporating three receiver systems and two groups of reflectors.
Figure 4:
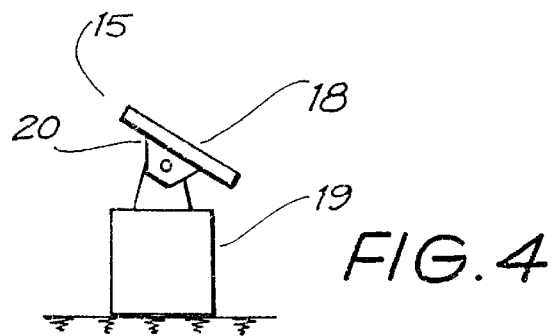
FIG. 4 shows a typical mounting arrangement for one reflector element.

As illustrated in FIG. 1, the solar collector system incorporates three spaced-apart, parallel receiver systems 10, 11 and 12 which are separated by two reflector groups 13 and 14. Each of the reflector groups comprises an array of reflectors 15 positioned in parallel rows 16 and disposed to reflect incident radiation to one or the other of the adjacent receiver systems 10, 11 or 12. Each of the receiver systems has a length l typically in the order of 250 to 500 meters and each pair of receiver systems will typically be spaced apart by a reflector field width w in the order of 50 meters. With the system having these dimensions the receiver systems will be mounted to masts 17 having a height in the order of 13 meters and the reflectors will provide a ground cover in the order of 50%. The reflectors may be positioned with the centre of their reflective surface 18 (FIG. 4) located approximately 1 meter above the ground, so that the receiver systems are elevated with respect to all of the reflectors, including any that may be located on high points of undulating ground.

All of the reflectors 15 in each row 16 are coupled mechanically and are mounted to support structures 19 in a manner to permit them to be pivoted through an angle up to approximately 90°, in order that they might:

(a) Adjust for small incremental changes in the angle of incident radiation and ensure that reflected radiation is spread substantially uniformly over the absorbing surface of the receiving systems 10, 11 and 12, and (b) Adjust for changes in the angle of incident radiation that would give rise to shading. As stated previously, shading may occur as a result of the reflectors blocking either incident radiation or reflected radiation.

Figure 2:
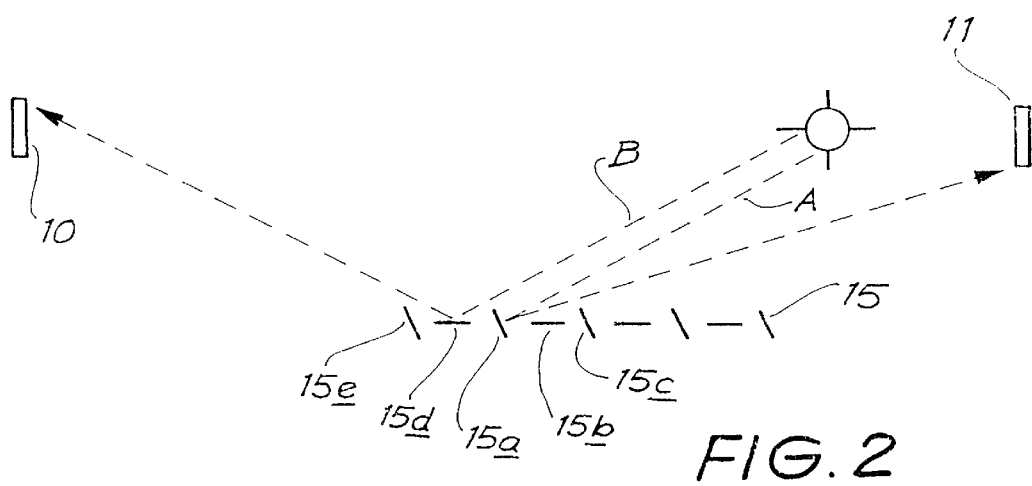
FIG. 2 shows the basic concept of orientating reflectors to avoid the shading of incident and reflected radiation.
Figure 3:
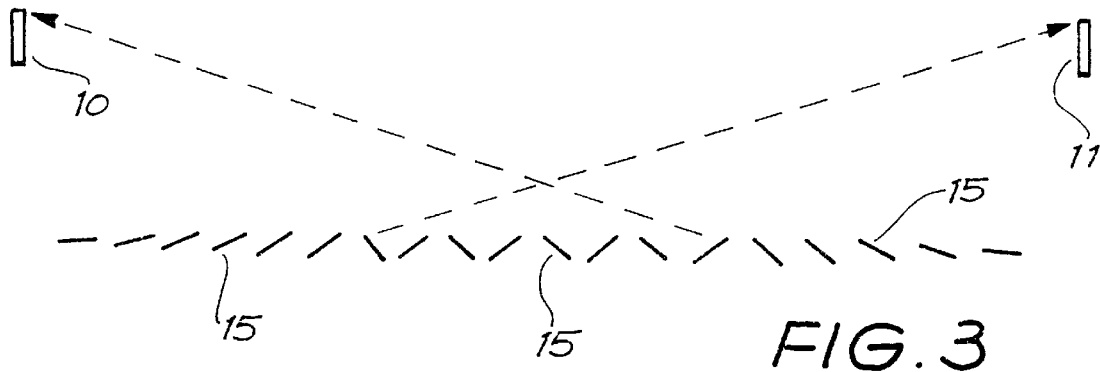
FIG. 3 shows a typical angular disposition of a group of reflectors located between two receiver systems.

As illustrated in FIG. 2 of the drawings, alternative rows 16 of the reflectors 15 may be orientated to horizontal and acute angle positions, so that radiation along path A is reflected by reflector 15a to the receiver system 11 without blockage being caused by either of the reflectors 15b or 15c, and radiation along path B is reflected by reflector 15d to receiver system 11 without blocking being caused by either of the reflectors 15a or 15e. However, it will be understood that the arrangement shown in FIG. 2 is purely illustrative of one possible arrangement and that different reflector orientations may be appropriate to meet different conditions. One such condition is illustrated schematically in FIG. 3.

Each reflector 15 may comprise a polished metal or a glass mirror and its reflective surface 18 may be flat or be formed with a slight concentrating curve. In an alternative arrangement, each reflector may be fabricated from a plastics material and be coated or otherwise clad with a reflective surface.

The reflector 15 is itself mounted to a support frame 20 which is carried by an axle that provides for single-axis pivoting of the reflector. The entire reflector assembly is carried by the ground engaging support structure 19, which is dimensioned to support the reflector about 1 meter above the ground and which contains a drive mechanism for the reflector. Each reflector might typically have a length in the order of 2 meters, so that approximately 25 individual reflectors will form a single row 16 of reflectors.

Figure 5:
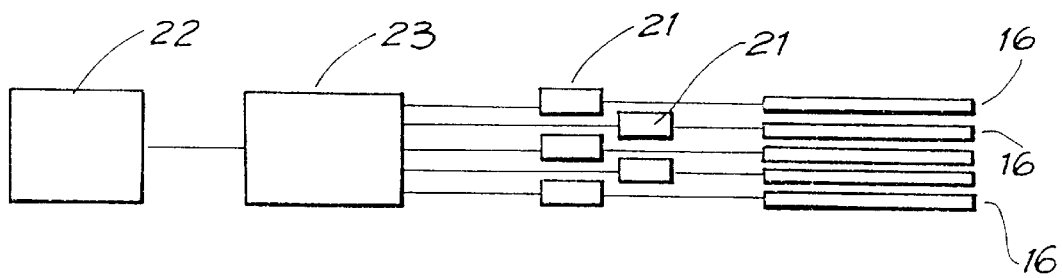
FIG. 5 shows diagrammatically an electrical control system applicable to the reflectors.

As indicated in FIG. 5, a separate drive system is coupled to each row 16 of reflectors, and each drive system may comprise a plurality of synchronised tracking motors 21 or stepping motors for imparting uniform angular drive to the reflectors 15 that form each of the rows 16. Drive to the reflectors may be controlled by a sensor 22 which is arranged to detect the position of the sun and generate appropriate drive signals by way of a processor 23 for the tracking motors 21 that are associated with the reflectors 15 in the respective rows 16. In an alternative arrangement (not shown), the drive signal may be generated in a microprocessor that is controlled by a computer generated signal that is representative of the position of the sun at periodic intervals.

Figure 7:
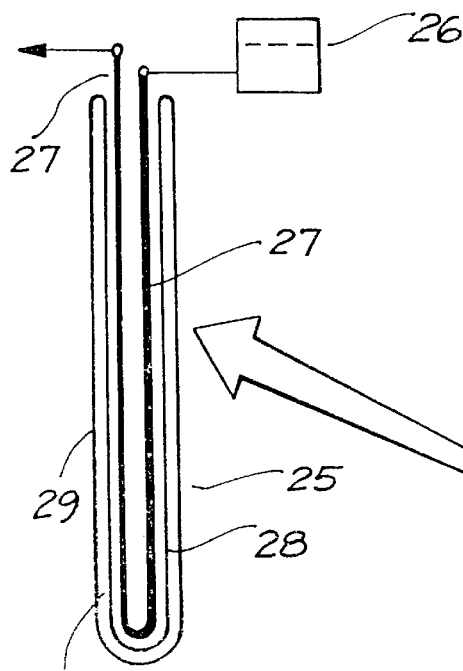
FIG. 7 shows a single collector element removed from the receiver system illustrated in FIG. 6, and FIG. 8 provides a diagrammatic representation in end view of a receiver system which may be employed as an alternative to the receiver system shown in FIG. 6.

Each of the receiver systems 10, 11 and 12 comprises a rack 24 of vertically extending tubular collector elements 25 which have a length in the order of 1.4 meters. The rack 24 mounts all of the collector elements 25 in close spaced relationship and incorporates upper manifolds 26 which, as shown schematically in FIG. 7, are arranged to deliver water to and carry steam from each of the collector elements using a metal U-tube arrangement 27.

The collector elements 25 comprise single-ended glass tubes which have inner and outer tube components 28 and 29 separated by an evacuated space 30. The outer surface of the inner tube 28 is coated with a solar selective surface coating, for example a graded or multi-layer cermet coating upon a bright metal base, which is structured to absorb solar radiation and transmit thermal energy to the heat exchange fluid which is passed through the tube. A metal fin (not shown) may be located within the inner tube component 28 of the collector element to assist in energy transfer from the glass tube to the metal U-tube 27.

Figure 6:
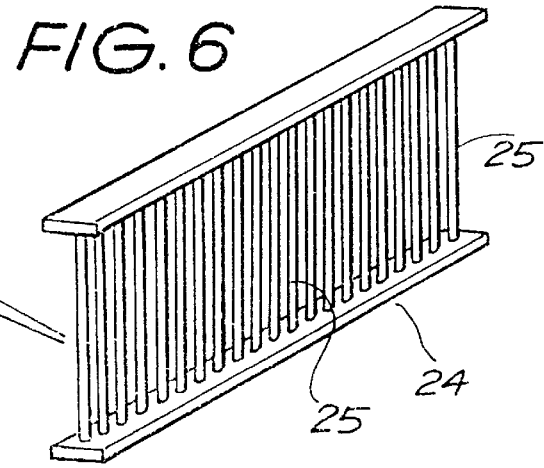
FIG. 6 shows a portion of one of the receiver systems.

Although the collector elements 25 are shown in FIG. 6 as extending vertically between their upper and lower supports, the collector elements may be inclined diagonally at an angle within the range 30° to 60° to the horizontal so as to reduce the effective height of the receiver system structure 24. Furthermore, in the interest of enhancing collector efficiency, auxiliary reflector elements (not shown) may be provided to redirect to the collector elements 25 any radiation that might otherwise pass between adjacent collector elements.

Figure 8:
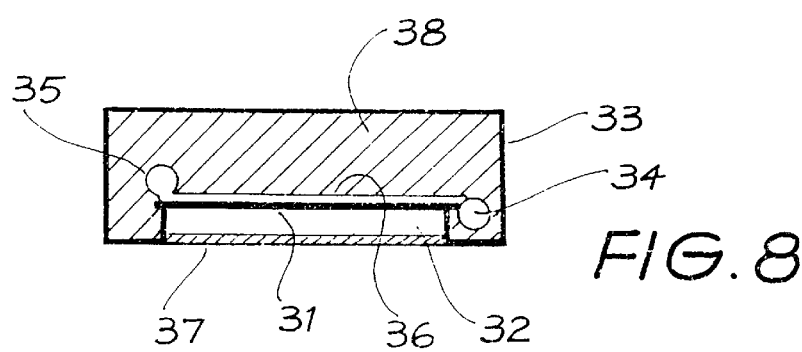

The alternative receiver system as shown in FIG. 8 of the drawings is in the form of an inverted cavity receiver which, as seen in cross-section, comprises a thin metal foil-like plate 31 which is carried above a cavity 32 and within a sheet metal duct 33. Two longitudinally extending manifolds 34 and 35 are supported within the duct 33, the lower one of which is intended to carry water and the upper one of which is intended to carry steam. A plurality of parallel heat exchange tubes 36 extend between and interconnect the manifolds 34 and 35, and the tubes 36 lay in contact with the upper surface of the plate 31.

The under surface of the plate 31 is clad with a solar selective surface coating of the type described above in the context of the collector elements 25, and a glass panel 37 closes the cavity 32. The cavity is occupied by an inert gas or stagnant air and the interior of the duct 33 is filled with an insulating material 38.

I claim:

1. A solar energy collector system which comprises: a group of reflectors arranged in parallel rows, the reflectors being supported at least at ground level, two spaced-apart target receiver systems located one at each end of the group of reflectors, the receiver systems being supported above ground level and being elevated relative to the group of reflectors, support structures pivotably mounting the reflectors, with some of reflectors being orientated angularly to reflect incident solar radiation toward one of the receiver systems and others of the reflectors being orientated angularly to reflect incident solar radiation to the other of the receiver systems, a drive means for imparting pivotal movement to the reflectors, whereby the reflectors are positioned angularly to maintain reflection of incident solar radiation toward the receiver systems, and for selectively pivoting at least some of the reflectors to an extent such that they are reorientated to shift the direction of reflected solar radiation from one of the receiver systems to the other receiver system.

2. The collector system as claimed in claim 1 wherein all of the reflectors within the group are arranged to be pivoted by the drive means to such an extent as to shift the direction of reflection of radiation from one to the other of the receiver claims.

3. The collector system as claimed in claim 1 wherein some of the reflectors within the group are arranged to be pivoted by the drive means to such an extent as to shift the direction of reflection of solar radiation from one to the other of the receiver systems, and wherein other reflectors within the group are arranged to be pivoted by the drive means to such an extent as to change the angle of reflection of radiation but without shifting the direction of radiation from one to the other of the receiver systems.

4. The collector system as claimed in claim 1 wherein each receiver system comprises a solar-to-thermal energy exchange system.

5. The collector system as claimed in claim 4 wherein each receiver system comprises at least one rack of arrayed collector elements through which a heat exchange fluid is passed in use of the system.

6. The collector system as claimed in claim 5 wherein each collector element comprises a glass tube through which heat exchange fluid is passed, the tube having inner and outer walls which define an evacuated space and the inner wall of the tube being coated with a solar selective surface coating.

7. The collector system as claimed in claim 6 wherein the collector tubes extend in a vertical direction between upper and lower support members of the rack.

8. The collector system as claimed in claim 6 wherein the collector tubes extend in a diagonal direction between upper and lower support members of the rack.

9. The collector system as claimed in claim 4 wherein each receiver system comprises at least one inverted cavity type receiver having a horizontally disposed, longitudinally extending absorber plate, a glass panel disposed in parallel relationship to the plate, and a gas-containing cavity separating the plate and the panel, the plate having an undersurface that is exposed to the cavity and which is coated with a solar selective surface coating and the receiver incorporating heat exchange tubes in contact with an upper surface of the plate.

10. The collector system as claimed in claim 1, wherein there are n groups of the reflectors and n+1 said receiver systems, each group of reflectors being positioned between two of said receiver systems.

11. The collector system as claimed in claim 10 wherein the reflectors within each group are arranged in linear rows which extend parallel to the receiver systems.

12. The collector system as claimed in claim 11 wherein the reflectors within each row are coupled mechanically.

13. The collector system as claimed in claim 12 wherein the drive system is coupled to each row of reflectors and is arranged to effect relative pivoting of the reflectors in a manner to adjust for small incremental changes in the angle of incident radiation, whereby radiation reflected from the reflectors is spread substantially uniformly over the absorbing surface of the receiving system to which the radiation is reflected.

14. The collector system as claimed in claim 1 wherein each reflector is shaped to effect concentration of reflected solar radiation.

* * * * *